3,005,722
GLASS COMPOSITION

Nicholas F. Cerulli, Caldwell, N.J., assignor to Westinghouse Electric Corporation, East Pittsburgh, Pa., a corporation of Pennsylvania
No Drawing. Filed May 28, 1959, Ser. No. 816,405
7 Claims. (Cl. 106—54)

This invention relates to glass compositions and, more particularly, to a glass composition that is especially adapted for use in conjunction with ceramic type electroluminescent devices.

As is well known, in ceramic type electroluminescent devices, such as an electroluminescent lamp or the like, the electroluminescent phosphor particles are embedded in a layer of fused ceramic material such as glass. In fabricating such devices a batch of the glass is first prepared and then pulverized to form a "frit" that is mixed with the proper amount of electroluminescent phosphor. A layer of this mixture is then deposited on a suitable base plate such as a sheet of enameling iron and fired in situ to form the desired fused dielectric-phosphor coating. Since the glass is intimately associated with and envelops the electroluminescent phosphor particles it serves both as a dielectric and protective matrix therefor and accordingly must not only display the proper electrical characteristics but must also have the necessary physical, chemical and optical properties.

In order to be suitable for use in an electroluminescent device the glass should have the following properties:

(a) It should have a coefficient of expansion that approximates that of the base material to which it is bonded so that the fused coating will be resistant to mechanical and thermal shocks and remain free from such defects as crazing, cracking, chipping, etc.

(b) The glass should fire at a temperature below that at which the electroluminescent phosphor would decompose or have its light-producing capability seriously impaired. For zinc sulfide type electroluminescent phosphors the glass should have a firing temperature below 700° C. and preferably about 600° C.

(c) The melt formed during firing should completely wet the electroluminescent phosphor particles and the viscosity and surface tension of the melt should be such that a smooth glossy coating of uniform thickness is formed.

(d) The glass should not contain impurities such as lead, nickel, cobalt, iron, tellurium, or selenium for example which would tend to react with the electroluminescent phosphor and deleteriously affect its light-generating properties.

(e) The glass should be non-hygroscopic since the absorption of the water would cause the electrical properties of the electroluminescent device to deteriorate and thus deleteriously affect its performance. The glass should have good chemical durability for the same reasons.

(f) The glass should have a low power or dissipation factor and a high dielectric constant. Desirably, the dissipation factor should not exceed .004 (at room temperature) for the frequency range of 100 to 10,000 c.p.s., and the dielectric constant should be greater than at least 7.

(g) The glass should be a good insulator and have a dielectric or breakdown strength of at least 250 volts per mil.

(h) The glass when fired should be substantially colorless and be able to transmit the light produced by the phosphor. Desirably, the glass should transmit visible radiations and ultraviolet radiations down to about 3650 A.U.

While any or all of the foregoing properties may be obtained at the sacrifice of others by means of known glass formulations and many glasses are known which display the desired electrical characteristics, such glasses do not display all of the above-mentioned properties and hence have not been entirely suitable for use in electroluminescent devices.

It has been discovered that by combining preselected amounts of certain alkali oxides together with preselected quantities of zinc oxide, boric oxide and other selected materials a zinc silico-borate glass is formed that not only exhibits the desired electrical properties and low firing temperature but surprisingly meets all of the other aforementioned requirements as well. The glass composition and permissible ranges of its constituents are given in Table I below:

Table I

| Constituent: | Amount (weight percent) |
|---|---|
| $Li_2O$ | .5 to 2 |
| $Na_2O$ | 2 to 8 |
| $K_2O$ | 4 to 16 |
| $BaO$ | 3 to 10 |
| $ZnO$ | 20 to 40 |
| $Al_2O_3$ | 1 to 5 |
| $TiO_2$ | 1 to 7 |
| $B_2O_3$ | 18 to 36 |
| $SiO_2$ | 7 to 14 |
| | 100 |
| F | 0 to 2 |

While the concentration of $Li_2O$, $Na_2O$ and $K_2O$ may vary within the ranges indicated it is essential that the ratio of $Li_2O/Na_2O/K_2O$ be maintained at approximately 1/4/8 respectively in order for the glass to have the desired low firing temperature. As indicated by the symbol F in Table I, approximately 0 to 2% by weight of the oxides may be in the form of a fluoride of any of the compounds without noticeably changing the characteristics of the glass. In addition, up to 5% by weight of $CaO$, $MgO$, $P_2O_5$ or other materials or mixtures thereof may be present as constituents to increase the chemical stability and hardness of the glass, as is well known in the art.

The glass may be broadly characterized as a zinc silicoborate type glass and as indicated in Table I, contains as principal constituents up to 40% by weight of $ZnO$, up to 14% by weight of $SiO_2$, up to 36% by weight of $B_2O_3$, and up to a total of 26% by weight of $Li_2O$, $Na_2O$ and $K_2O$ in the ratio of approximately 1/4/8 respectively. $BaO$, $Al_2O_3$ and $TiO_2$ up to a total of 22% by weight are also present in the composition as minor constituents with the $TiO_2$ not exceeding 7% by weight.

Specific examples of several glass compositions illustrating the present invention are given below in Table II along with several of their most critical properties, the compositions being given in percent by weight of their respective batches on the customary oxide basis:

Table II

| Constituent | Examples | | |
|---|---|---|---|
| | 1 | 2 | 3 |
| $Li_2O$ | 1.3 | 1.5 | 1.6 |
| $Na_2O$ | 5.2 | 6.1 | 6.7 |
| $K_2O$ | 10.3 | 12.0 | 12.9 |
| $BaO$ | 6.2 | 6.0 | 5.5 |
| $ZnO$ | 30.8 | 29.8 | 27.3 |
| $Al_2O_3$ | 2.6 | 2.5 | 2.3 |
| $TiO_2$ | 3.6 | 3.5 | 3.2 |
| $B_2O_3$ | 27.5 | 26.6 | 33.3 |
| $SiO_2$ | 12.5 | 12.0 | 7.2 |
| F | 0.4 | 0.4 | 0.4 |
| Firing Temperature, ° C | 580 | 540 | 520 |
| Dielectric Constant | 7.8 | 7.7 | 7.8 |
| Dissipation Factor | 0.001 | 0.001 | 0.001 |
| Dielectric Strength, v./mil | 400 | 400 | 400 |

In the glass compositions given in both Tables I and II the percent by weight of the various constituents is calculated from the materials used to make the respective batches, that is, the calculated metal content in each case actually refers to the content of the raw mix constituent and assumes that associated volatile compounds such as water and carbon dioxide are eliminated. The foregoing glasses may accordingly be fabricated by mixing carbonates, borates, etc. of the various components which will decompose to the corresponding oxides during smelting. For example, the boric oxide content may be calculated from such raw mix constituents as boric acid or borax.

The glass is made in accordance with conventional glass-making practice. As a specific example, ingredients that will yield when decomposed by heating the calculated oxide compounds are mixed and heated in a crucible to 1250° C. for a period of ½ to 1 hour. A platinum crucible is preferred to prevent the glass from becoming contaminated during smelting. The smelting schedule is not critical and other temperatures and times may be employed. After cooling, the glass is ground to form a powder or so-called "frit." The particle size of the frit is not critical and as an example may be such that the frit will pass through a 325 mesh sieve. The frit is then mixed with a predetermined amount of electroluminescent phosphor such as the well-known copper-activated zinc sulfide phosphor and the resultant mixture deposited on a base plate such as a clean porcelain-enameled iron plate and fused in situ thereon by heating it in air to the firing temperature of the particular glass composition employed. Glasses prepared in accordance with the present invention form a clear glossy coating when fired that is inert with respect to the electroluminescent phosphor and tenaciously adheres to the metal base plate. The glass has good flow properties, readily assimilates the phosphor particles without damaging them, is chemically stable in air and readily transmits the radiations produced by the electroluminescent phosphor.

While several specific examples of glass compositions have been described in detail in accordance with the patent statutes, it is to be particularly understood that other compositions may be made by selecting the proper combination of ingredients within the prescribed limiting ranges without departing from the spirit or scope of this invention.

I claim:

1. A glass consisting essentially of the following constituents in the indicated proportions:

| Constituents: | Percent by weight |
|---|---|
| $Li_2O$ | 0.5–2 |
| $Na_2O$ | 2–8 |
| $K_2O$ | 4–16 |
| BaO | 3–10 |
| ZnO | 20–40 |
| $Al_2O_3$ | 1–5 |
| $TiO_2$ | 1–7 |
| $B_2O_3$ | 18–36 |
| $SiO_2$ | 7–14 | wherein the ratio of $Li_2O/Na_2O/K_2O$ is approximately 1/4/8.

2. A glass as set forth in claim 1 wherein approximately 0 to 2% by weight of the oxide content is in the form of fluoride.

3. A zinc silico-borate glass consisting essentially of the following ingredients in the indicated proportions:

| | Percent by wt. |
|---|---|
| ZnO | 20–40 |
| $SiO_2$ | 7–14 |
| $B_2O_3$ | 18–36 |
| $Li_2O$, $Na_2O$ and $K_2O$ | 6.5–26 |
| BaO | 3–10 |
| $Al_2O_3$ | 1–5 |
| $TiO_2$ | 1–7 | wherein the ratio of $Li_2O/Na_2O/K_2O$ is approximately 1/4/8.

4. A glass as set forth in claim 3 containing as an additional constituent from 0 to 5% by weight of a substance selected from the group consisting of CaO, MgO and $P_2O_5$, and mixtures thereof.

5. A frit composition comprising a granulated zinc silico-borate glass consisting essentially of the following constituents in approximately the indicated proportions:

| Constituents: | Percent by weight |
|---|---|
| $Li_2O$ | 1.3 |
| $Na_2O$ | 5.2 |
| $K_2O$ | 10.3 |
| BaO | 6.2 |
| ZnO | 30.8 |
| $Al_2O_3$ | 2.6 |
| $TiO_2$ | 3.6 |
| $B_2O_3$ | 27.5 |
| $SiO_2$ | 12.5 |

6. A frit composition comprising a granulated zinc silico-borate glass consisting essentially of the following constituents in approximately the indicated proportions:

| Constituents: | Percent by weight |
|---|---|
| $Li_2O$ | 1.5 |
| $Na_2O$ | 6.1 |
| $K_2O$ | 12.0 |
| BaO | 6.0 |
| ZnO | 29.8 |
| $Al_2O_3$ | 2.5 |
| $TiO_2$ | 3.5 |
| $B_2O_3$ | 26.6 |
| $SiO_2$ | 12.0 |

7. A frit composition comprising a granulated zinc silico-borate glass consisting essentially of the following constituents in approximately the indicated proportions:

| Constituents: | Percent by weight |
|---|---|
| $Li_2O$ | 1.6 |
| $Na_2O$ | 6.7 |
| $K_2O$ | 12.9 |
| BaO | 5.5 |
| ZnO | 27.3 |
| $Al_2O_3$ | 2.3 |
| $TiO_2$ | 3.2 |
| $B_2O_3$ | 33.3 |
| $SiO_2$ | 7.2 |

References Cited in the file of this patent

UNITED STATES PATENTS

| 2,433,883 | Armistead | Jan. 6, 1948 |
| 2,482,533 | Andrews | Sept. 20, 1949 |
| 2,726,965 | Cressman et al. | Dec. 13, 1955 |
| 2,774,737 | Mager | Dec. 18, 1956 |
| 2,906,631 | Rindone | Sept. 29, 1959 |

FOREIGN PATENTS

| 723,087 | Great Britain | Feb. 2, 1955 |